United States Patent
Ruffini et al.

(10) Patent No.: US 9,210,646 B2
(45) Date of Patent: Dec. 8, 2015

(54) BACK-UP PATH FOR IN-HOME DIAGNOSTICS AND OTHER COMMUNICATIONS

(71) Applicant: Verizon Patent and Licensing Inc., Basking Ridge, NJ (US)

(72) Inventors: Michael P. Ruffini, Methuen, MA (US); Lily F. Chen, Fort Lee, NJ (US); Joseph G. Fragale, Ridgewood, NJ (US); Dwight W. Fronsdahl, Groton, MA (US); Sankar Subramanian, Ossining, NY (US); Dale E. Veeneman, Southborough, MA (US); Dongchen Wang, Concord, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 181 days.

(21) Appl. No.: 13/939,554

(22) Filed: Jul. 11, 2013

(65) Prior Publication Data

US 2015/0016241 A1    Jan. 15, 2015

(51) Int. Cl.
*H04W 40/28* (2009.01)
*H04L 12/707* (2013.01)
*H04L 12/703* (2013.01)

(52) U.S. Cl.
CPC .............. *H04W 40/28* (2013.01); *H04L 45/22* (2013.01); *H04L 45/28* (2013.01)

(58) Field of Classification Search
None
See application file for complete search history.

(56) References Cited

U.S. PATENT DOCUMENTS

| | | | |
|---|---|---|---|
| 2002/0122394 A1* | 9/2002 | Whitmore et al. | 370/328 |
| 2005/0174935 A1* | 8/2005 | Segel | 370/228 |
| 2010/0115074 A1* | 5/2010 | Tapiola | 709/223 |
| 2014/0071867 A1* | 3/2014 | Yeh | 370/311 |

* cited by examiner

Primary Examiner — Ian N Moore
Assistant Examiner — Lakeram Jangbahadur

(57) ABSTRACT

A local router for a home network pairs with a mobile device via a local network connection. The local router is also connected to a wide area network. The local router receives, from the mobile device and over the local network connection, configuration settings for a backup path for the wide area network. The backup path includes the local network connection and a mobile broadband connection using the mobile device. The local router detects an interruption with the local router's connection to the managed wide area network and forwards, based on the detecting, critical traffic from the home network via the backup path.

20 Claims, 10 Drawing Sheets

BACK-UP PATH FOR IN-HOME DIAGNOSTICS AND OTHER COMMUNICATIONS

BACKGROUND

Remote management of end-user devices can be accomplished through known protocols that enable activities such as configuration and diagnostics of the end-user devices using remote servers. This remote management requires bidirectional communications between the remote servers and the end-user devices.

DETAILED DESCRIPTION OF PREFERRED EMBODIMENTS

The following detailed description refers to the accompanying drawings. The same reference numbers in different drawings may identify the same or similar elements.

Systems and methods provided herein may enable a backup path for home network communications using a mobile device (e.g., a smart phone). Remote management of customer premises equipment (CPE), such as a set-top box (STB) or other end-user devices, generally provides a user-friendly and low-cost solution for device configuration, maintenance, and diagnostics. Remote management generally requires bidirectional communications between remote servers and the end-user devices. When connectivity between the CPE and the remote servers is disabled, remote management functions are also effectively disabled, along with other home network communications. As described further herein, a mobile device may provide a bidirectional backup path, for some or all communications over a failed primary network link, using a local connection with a home router and a mobile broadband connection.

According to an implementation described herein, a local router for a home network may be paired with a mobile device via a local network connection. The local router may also be connected to a wide area network. The local router may receive, from the mobile device and over the local network connection, configuration settings for a backup path for the wide area network. The backup path may include the local network connection and a mobile broadband connection using the mobile device. The local router may detect an interruption with the local router's connection to the managed wide area network and may forward, based on the detecting, traffic from the home network via the backup path.

Figure 1:
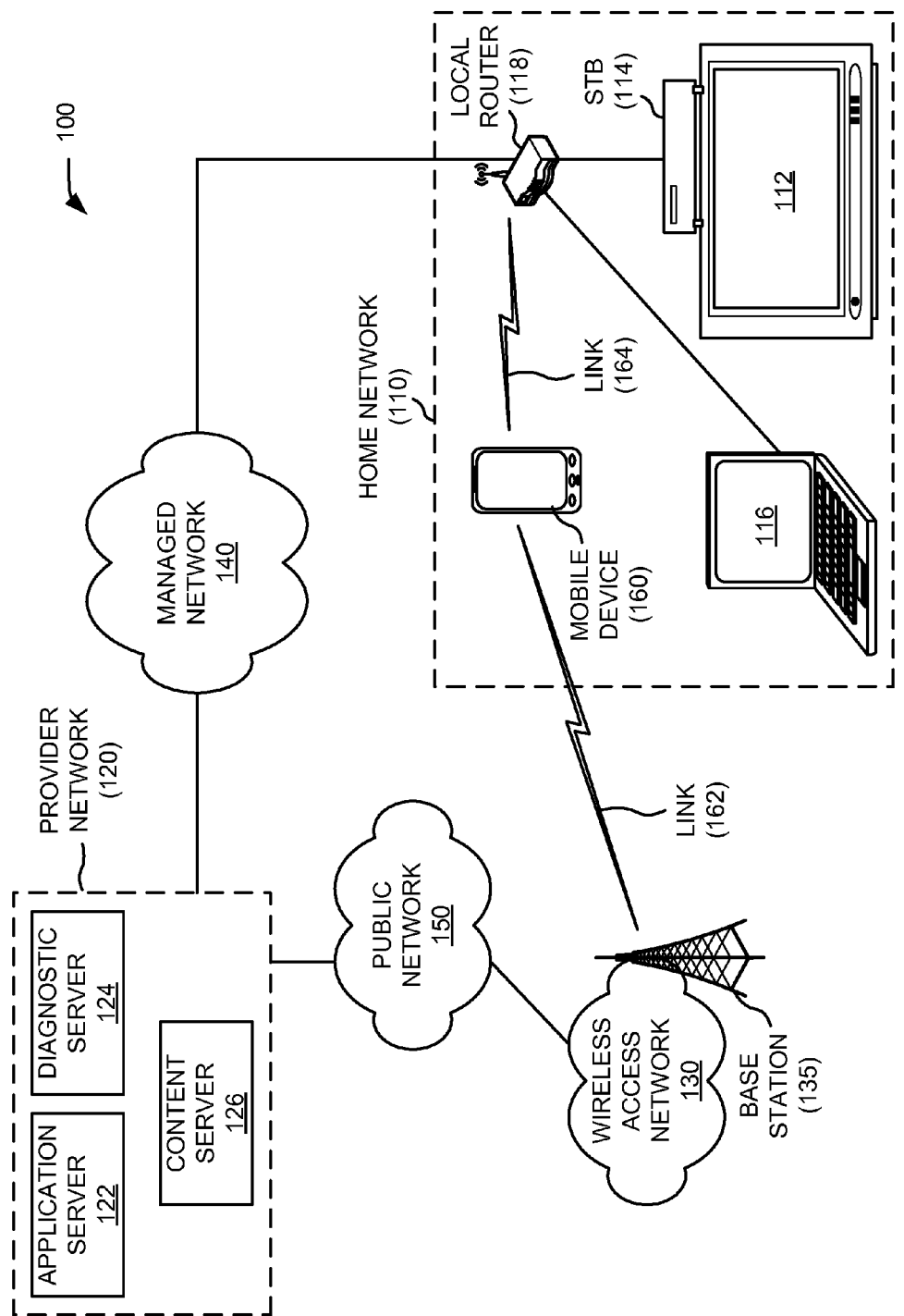
FIG. 1 is a diagram illustrating an exemplary network in which systems and/or methods described herein may be implemented.

FIG. 1 is a diagram illustrating an exemplary network 100 in which systems and/or methods described herein may be implemented. As illustrated, network 100 may include a home network 110, a provider network 120, a wireless access network 130, a managed network 140, a public network 150, and a mobile device 160. Components of network 100 may be connected via wired and/or wireless links.

Home network 110 may generally include one or more devices within customer premises (e.g., business or residential premises) connected to each other and/or to managed network 140. Devices in home network 110 may include, for example, one or more of a television display 112, a set-top box (STB) 114, a computing device 116, and a local router 118. Home network 110 may also include other networking equipment and/or devices, such as additional media storage devices or routers, cables, splitters, etc. (not shown). In one implementation, home network 110 may support wireless communications (e.g., using IEEE 802.11 standards).

Television display 112 may include any device capable of receiving and reproducing video signals. In one implementation, television display 112 may include a television. In another implementation, television display 112 may include, for example, a display of a stationary communication device (e.g., a computer monitor or a telephone), or a display of a portable communication device (e.g., a mobile telephone or a personal digital assistant (PDA)).

STB 114 may include a device for selecting, obtaining (e.g., from provider network 120), and/or recording content that may be shown or played on television display 112 or another device. Examples of STB 114 may include a media client, a set-top box, a computer, a cable card, and a portable electronic device. STB 114 may allow a user to alter programming provided to television display 112 (e.g., a channel up or channel down signal) or provide input for interactive menus (e.g., to navigate menu displays or input data) based on a signal from a remote control (not shown). In one aspect, STB 114 may receive a television (or other programming) signal from a content server (e.g., content server 126, described below), may convert the signal to a form usable by television display 112, and may transmit the signal to television display 112 for display. In one implementation, STB 114 may be a closed device (e.g., including a hardware/software configuration that is not accessible to the general public) that restricts unauthorized alteration of services and/or programming delivered over managed network 140. In another aspect, STB 114 may provide a user interface (via television display 112) to invoke diagnostic and/or troubleshooting procedures for home network 110.

Computing device 116 may include a computational or communication device. Computing device 116 may enable a user to send/receive messages, view content, and/or interact with other devices via a local wired and/or wireless network. For example, computing device 116 may include a personal computer (e.g., a laptop or desktop PC), a tablet computer, a smart phone, a gaming system, a personal media player, or other types of computational or communication devices that can communicate with local router 118.

Local router 118, also referred to as a broadband home router (BHR) or home network gateway (HNG), may act as a hub for communications entering home network 110. For example, devices in provider network 120 may communicate with one or more devices in a customer's home network 110 (e.g., STB 114 or computing device 116) via managed network 140 and local router 118. Similarly, local router 118 may forward communications from devices in a customer's home network 110 (e.g., STB 114 or computing device 116) to devices in provider network 120 via managed network 140. In some implementations, local router 118 may communicate with devices in home network 110 and facilitate communications between devices in home network 110. In one implementation, local router 118 may use an IEEE 802.11g/n (e.g., Wi-Fi) protocol and/or an IEEE 802.15 (e.g., Bluetooth™) protocol. In another implementation, local router 118 may also include one or more wired (e.g., Ethernet, TIA Cat 3 cable, USB, etc.) connections. As described further herein, local router 118 may be configured to implement remote management, of devices within home network 110, from one or more devices within provider network 120. For example, local router 118 may generally be configured to support Technical Report 069 (TR-069) protocols as published by the Broadband Forum. In other implementations, local router 118 may be configured to support other related protocols, including (but not limited to) TR-098, TR-104, TR106, TR-111, TR-135, etc., and/or other protocols to support communications with devices within provider network 120.

Provider network 120 may include network devices that provide backend services to devices in home network 110, including services to provide content and enable remote management. Provider network 120 may include, for example, one or more private IP networks that use a private IP address space. Provider network 120 may include a local area network (LAN), an intranet, a private wide area network (WAN), etc. In one implementation, provider network 120 may implement one or more Virtual Private Networks (VPNs) for providing communication between devices within provider network 120. Provider network 120 may be protected/separated from other networks, such as managed network 140, by a firewall. Although shown as a single element in FIG. 1, provider network 120 may include a number of separate networks. As shown in FIG. 1, provider network 120 may include an application server 122, a diagnostic server 124, and a content server 126.

Application server 122 may include one or more network devices, or other types of computation or communication devices that gather, process, search, and/or provide information in a manner described herein. In one exemplary implementation, application server 122 may provide applications, data, and/or services to mobile device 160. In one aspect, application server 122 may provide a backup mode configuration application to mobile device 110 to facilitate communications described herein. For example, the backup mode configuration application may be downloaded by a user onto mobile device 160 and used to setup mobile device 160 as a backup communications channel for local router 118.

Diagnostic server 124 may include a network device that provides backend support for remotely configuring and performing diagnostics on customer premises equipment, such as STB 114 and/or local router 118. For example, diagnostic server 124 may receive device information from STB 114 and/or local router 118 that may be used to troubleshoot connectivity issues or other problems with STB 114 and/or local router 118. In one implementation, diagnostic server 124 may implement CPE WAN Management Protocols in accordance with TR-069. According to implementations described herein, diagnostic server 124 may communicate with local router 118 via managed network 140 or via a backup path using mobile device 160.

Content server 126 may include one or more network devices, or other types of computation or communication devices, that gather, process, search, and/or provide information in a manner described herein. In one implementation, content server 126 may include a computer system, a server device, a cable head-end, and/or a broadcasting device capable of providing data (e.g., video content, multimedia content, applications, file downloads, advertising, instructions, images, voice over IP content, application data, and/or other information) to devices in home network 110 (e.g., via local router 118). According to implementations described herein, diagnostic server 124 may communicate with local router 118 via managed network 140 or via a backup path using mobile device 160.

Wireless access network 130 may include one or more devices for transmitting voice and/or data between public network 150 and mobile device 160. In one exemplary implementation, wireless access network 130 may include a group of base stations (e.g., base station 135) and a group of radio network controllers (not shown). In one example, wireless access network 130 may provide a radio access network (RAN) for mobile device 160. Wireless access network 130 may correspond to a broadband cellular network (also referred to as a mobile broadband network), such as a long-term evolution (LTE) network, an enhanced high-rate packet data (eHRPD) network, a WiMax network, etc.

Base station 135 (also referred to as an "eNode B") may include one or more devices that receive voice and/or data from wireless access network 130 and transmit that voice and/or data to mobile device 160 via an air interface. Base station 135 may also include one or more devices that receive voice and/or data from mobile device 160 over an air interface and transmit that voice and/or data to wireless access network 130 or other mobile devices 160.

Managed network 140 may include a video signaling and distribution network and system that permit transfer of data between provider network 120 and home network 110. Additionally, managed network 140 may include, among other things, a firewall, a filtering mechanism, a proxy, and/or network address translation mechanisms. Managed network 140 may include, for example, a single network, such as a WAN, a local area network (LAN), a metropolitan area network (MAN), a satellite network, etc., or a combination of networks. Managed network 140 may provide customers with multimedia content provided, for example, by devices in provider network 120. Managed network 140 may also support communications using Internet protocol (IP). Although shown as a single element in FIG. 1, managed network 140 may include a number of separate networks that function to provide services to devices in home network 110.

Public network 150 may include a WAN, an intranet, a telephone network (e.g., the Public Switched Telephone Network), or a combination of networks. Public network 150 may include, for example, an untrusted network, such as the Internet. Public network 150 may further include transport and/or network devices such as routers, switches, and/or firewalls.

Mobile device 160 may include a smart phone, a tablet, a laptop computer (e.g., with a wireless air card), a wireless device, a radiotelephone, a personal digital assistant (PDA) (e.g., that can include a radiotelephone, a pager, Internet/intranet access, etc.), a global positioning system (GPS) device, a gaming device, a mobile hot spot device, or other types of computation or communication devices. In an exemplary implementation, mobile device 160 may include a device that is capable of communicating over both a wireless access network link (e.g., link 162) and over a local link (e.g., link 164) to local router 118. For example, mobile device 160 may be configured to act as a mobile hotspot to share a broadband cellular link (e.g., link 162) with one or more other devices via one or more local links 164. In one aspect of link 164, mobile device 160 may provide an interface for a local wireless network via link 164, such as, for example, a wireless personal area network (e.g., Bluetooth™ protocol) or a wireless local area network (e.g., Wi-Fi). In another aspect, mobile device 160 may provide a wired interface via link 164, such as a USB connection. Link 162 and link 164 (along with public network 150) may provide a backup path to managed network 140. In implementations described herein, mobile device 160 may have the capability to download an application (e.g., a backup mode configuration application) from application server 122. Mobile device 160 may execute the backup mode configuration application to setup a backup path configuration and to enact failover to the backup path when local router 118 losses access to managed network 140.

In FIG. 1, the particular arrangement and number of components of network 100 are illustrated for simplicity. In practice there may be more home networks 110, provider network 120, wireless access networks 130, managed networks 140, public networks 150, and/or devices with each network. For example, there may be hundreds or thousands of home networks 110. As another example, local router 118 may implement multiple backup paths with two or more mobile devices 160 (e.g., in a synchronized manner).

Figure 2:
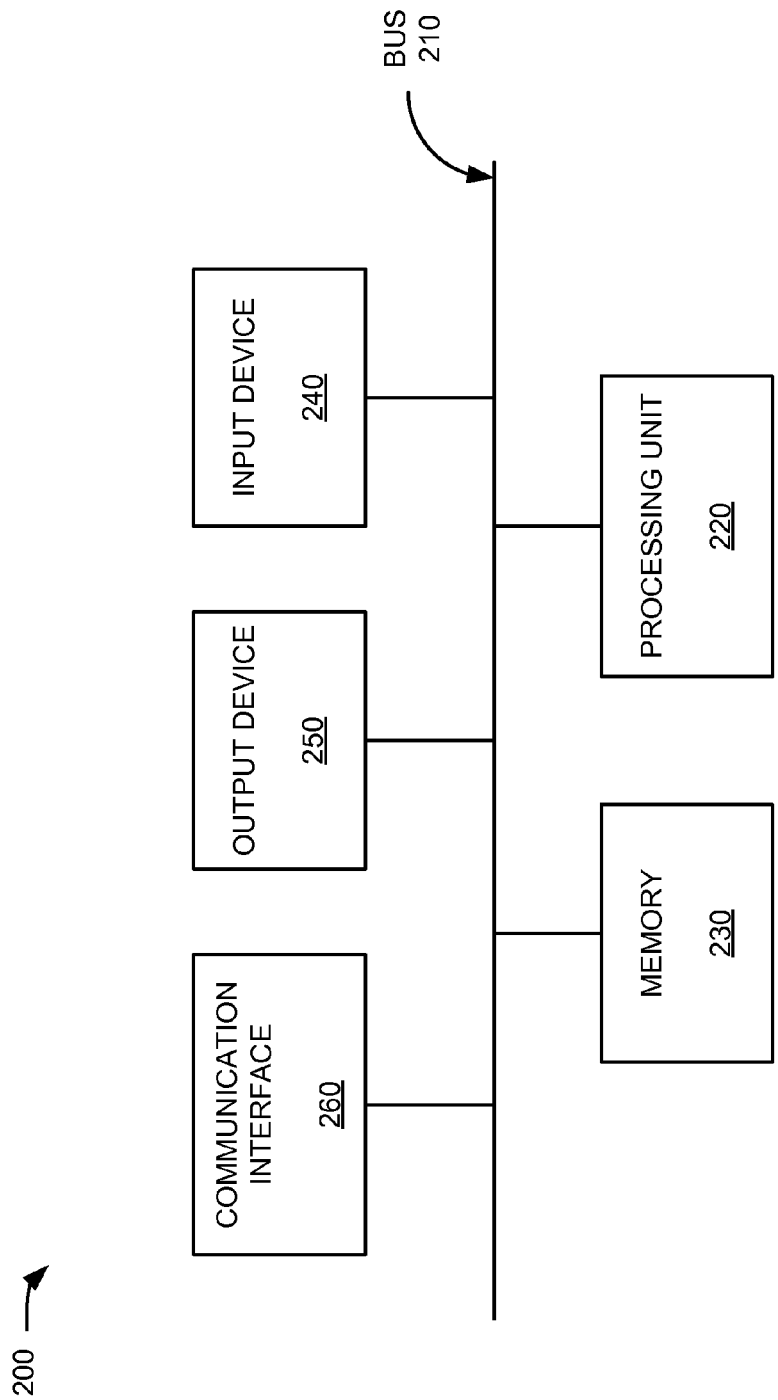
FIG. 2 is a block diagram illustrating exemplary components of a device that may correspond to one of the devices of FIG. 1.

FIG. 2 is a diagram of exemplary components of a device 200. Each of STB 114, computing device 116, local router 118, application server 122, diagnostic server 124, content server 126, and mobile device 160 may be implemented/installed as a combination of hardware and software on one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits a user to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of network 100.

As described herein, device 200 may perform certain operations in response to processing unit 220 executing software instructions contained in a computer-readable medium, such as memory 230. A computer-readable medium may include a non-transitory memory device. A memory device may be implemented within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently-arranged components, or additional components than those depicted in FIG. 2. As an example, in some implementations, a display may not be included in device 200. In these situations, device 200 may be a "headless" device that does not include input device 240. Alternatively, or additionally, one or more components of device 200 may perform one or more other tasks described as being performed by one or more other components of device 200.

Figure 3:
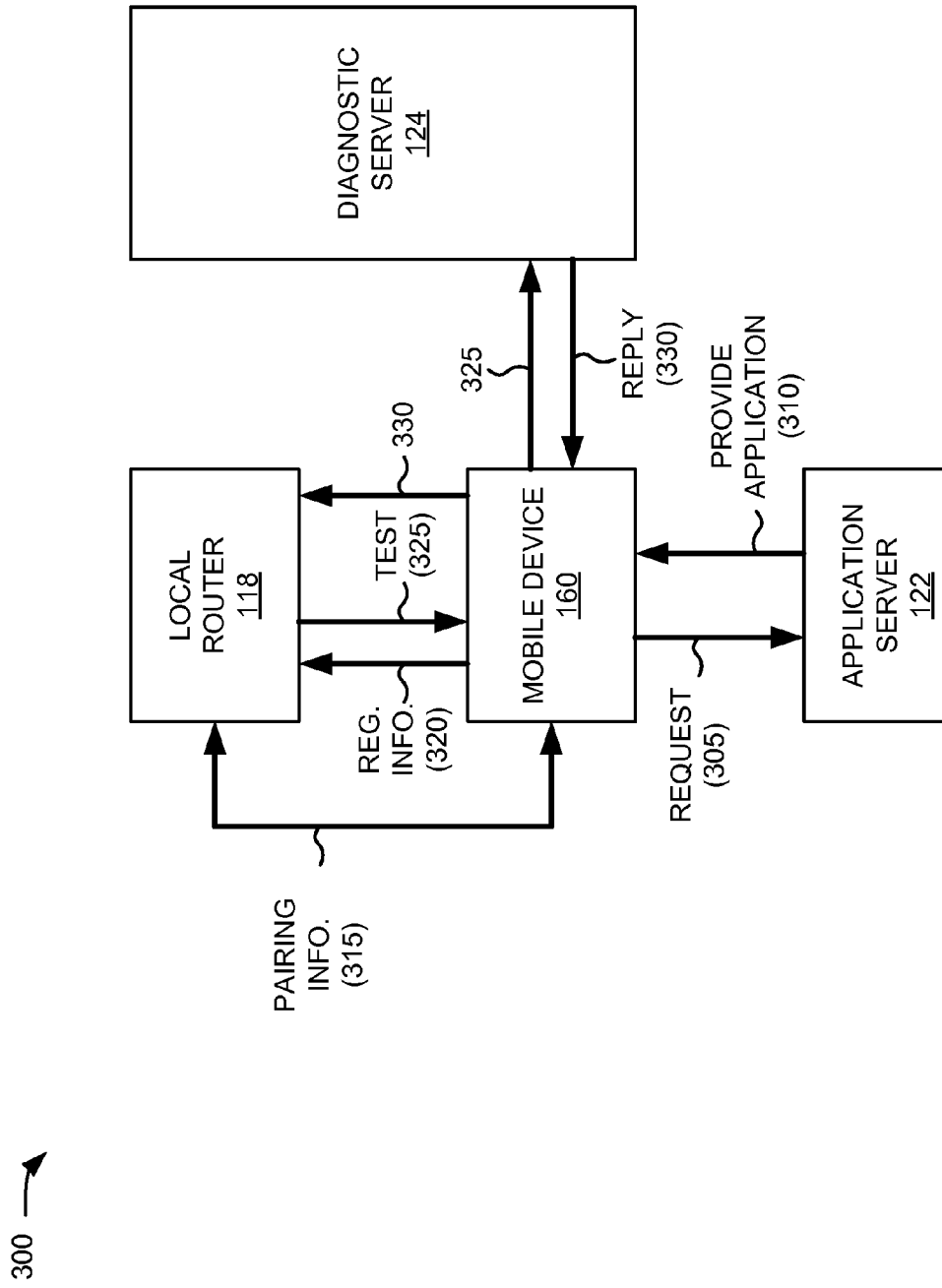
FIG. 3 is a block diagram illustrating exemplary communications between devices in a portion of the network of FIG. 1.

FIG. 3 is a diagram of exemplary communications for a portion 300 of network 100. Communications in FIG. 3 may represent communications to register a mobile device to provide backup connectivity to a home network. As shown in FIG. 3, network portion 300 may include local router 118, application server 122, diagnostic server 124, and mobile device 160. Local router 118, application server 122, diagnostic server 124, and mobile device 160 may include functionality described above in connection with, for example, FIGS. 1 and 2.

As shown in FIG. 3, mobile device 160 may provide a request 305 for a backup mode configuration application to application server 122. Request 305 may be provided, for example, by having a user of mobile device 160 navigate to a home page or mobile site associated with provider network 120. After registering or providing appropriate credentials, the provider network home page may provide, to mobile device 160, a menu of options that may include, for example, an option to download the backup mode configuration application. The user of mobile device 160 may select the particular menu option for the backup mode configuration application, causing mobile device 160 to provide request 305.

Application server 122 may receive request 305 and, in response, may forward the backup mode configuration application, as indicated by reference number 310, to mobile device 160. Mobile device 160 may receive and store application 310. In an alternate implementation, the backup mode configuration application may be installed prior to delivery of mobile device 160 to the user. The user of mobile device 160 may launch the backup mode configuration application to initiate a pairing process with local router 118. In one implementation, mobile device 160 and local router 118 exchange pairing information 315 to establish wireless communication, such as communications using a wireless personal area network (WPAN) connection or wireless local area network (WLAN) connection. In one aspect, the WLAN connection may be configured as an ad hoc point-to-point connection over Wi-Fi. In another aspect, a WPAN may be established using Bluetooth™ protocols. In still another aspect, mobile device 160 and local router 118 may be paired via a wired connection.

Once mobile device 160 and local router 118 are paired, mobile device 160 may provide registration information 320 to local router 118. Registration information 320 may include, for example, existing user account information (e.g., from an account with a service provider of provider network 120) and/or a new user account for the particular backup service. For example, a user of mobile device 160 may provide existing account information to gain permission to enter a different username and/or passcode. In general, registration information 320 may enable local router 118 to use an interface with mobile device 160 as a mobile hotspot or communications pass-through to access provider network 120 via wireless access network 130 and public network 150.

In one aspect, registration information 320 may include settings to enable local router 118 to use the backup interface with mobile device 160 for limited types of communications (referred to herein generally as "critical communications" or "critical traffic"). For example, using the backup mode configuration application, a user may identify particular types of traffic that are permitted over the backup interface. In one aspect, permitted types of traffic for critical communications may include only diagnostic/maintenance traffic. In another implementation, permitted types of traffic may include keep-alive messages, IP data, or other essential communications. In still another aspect, registration information 320 may include configuration settings for the backup interface to permit any traffic typically provided via managed network 140 over the backup interface on a priority basis. For example, a user may elect to prioritize voice, email, or instant message data over video traffic. Traffic may be filtered, for example, based on packet headers, port designations, or other methods of traffic identification, to block non-critical traffic from the backup path. In one aspect, settings for traffic filtering may be applied by both local router 118 and mobile device 160.

Based on pairing information 315 and registration information 320, local router 118 may provide a test signal 325 via mobile device 160 to a designated device in provider network 120, such as diagnostic server 124. For example, test signal 325 may provide communication settings, including an IP address for mobile device 160, to enable diagnostic server 124 to provide data to local router 118 via mobile device 160. Diagnostic server 124 may provide a reply 330 to local router 118 via mobile device 160 to confirm backup communications are properly configured.

Although FIG. 3 shows exemplary components of network portion 300, in other implementations, network portion 300 may include fewer components, different components, differently-arranged components, and/or additional components than depicted in FIG. 3. Alternatively, or additionally, one or more components of network portion 300 may perform one or more other tasks described as being performed by one or more other components of network portion 300.

Figure 4:
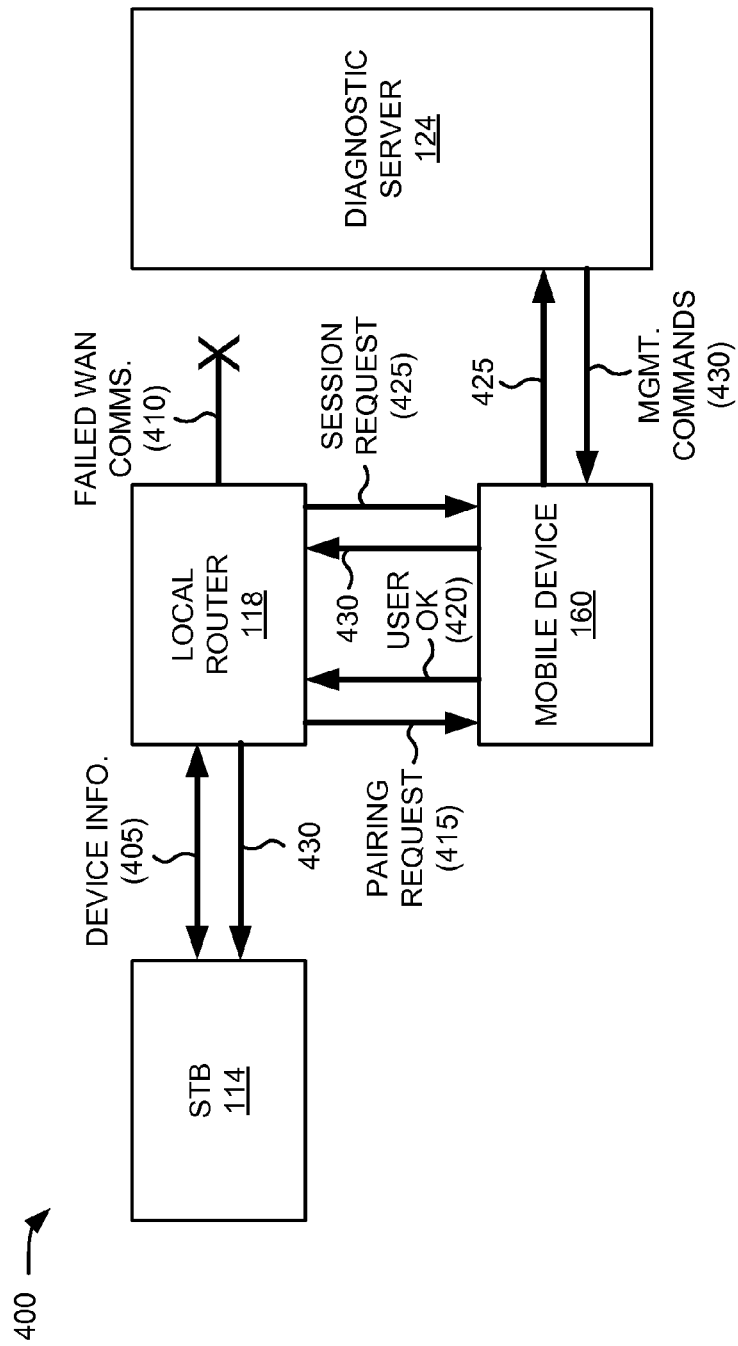
FIG. 4 is a block diagram illustrating additional exemplary communications between devices in another portion of the network of FIG. 1.

FIG. 4 is a diagram of exemplary communications for a different portion 400 of network 100. Communications in FIG. 4 may represent communications to provide backup connectivity, via a mobile device, for troubleshooting a home network. As shown in FIG. 4, network portion 400 may include STB 114, local router 118, diagnostic server 124, and mobile device 160. STB 114, local router 118, diagnostic server 124, and mobile device 160 may include functionality described above in connection with, for example, FIGS. 1-3.

As shown in FIG. 4, home router 118 may request and/or receive device information 405 from STB 114. Device information 405 may include, for example, parameter and/or configuration information for STB 114 that may be used for remote connectivity and/or diagnostics. In one aspect, device information 405 may include data conforming to TR-069 protocols. In other aspects, device information 405 may include other device information and/or error signals.

Local router 118 may detect failed WAN communications 410 with diagnostic server 124. For example, local router 118 may attempt, unsuccessfully, to forward device information 405 via managed network 140. As an indication of a connection failure, home router 118 may fail to receive expected communications or a response, within a timeout period, from diagnostic server 124 via an interface to managed network 140.

Upon detecting failed WAN communications 410, local router 118 may initiate a pairing request 415 with mobile device 160. Pairing request 415 may include, for example, a push notification or another signal to request a user of mobile device 160 to pair with local router 118. In one implementation, the configuration for pairing between local router 118 and mobile device 160 have been previously arranged via communications described above in connection with FIG. 3. In response to pairing request 415, mobile device 160 may present to a user an authorization request, and (assuming the user provides input to authorize the connection) mobile device 160 may establish a paired connection with local router 118 via user OK message 420.

Upon successful pairing with mobile device 160, local router 118 may use the paired connection with mobile device 160 to perform some or all communications (e.g., critical communications) with devices in provider network 120 that were previously accomplished over managed network 140. For example, local router 118 may provide a session request 425 to diagnostic server 124. The session request 425 may include, for example, parameters for local router 118 including, for example, a current IP address to enable communications to be directed from diagnostic server 124 to local router 118 via mobile device 160.

Diagnostic server 124 may receive session request 425 and establish a remote management session with local router 118 via mobile device 160. The remote management session may generally permit communications between devices in home network 110 and diagnostic server 124. More particularly, in one implementation, diagnostic server 124 may communicate with local router 118 to enable remote troubleshooting of local router 118 and/or other devices (e.g., STB 114, computing device 116, etc.) in home network 110. For example, diagnostic server 124 may provide, via mobile device 160, management commands 430 to local router 118 and/or STB 114. In one aspect, management commands 430 may include commands to permit diagnostics and/or remote management of local router 118 and/or STB 114.

Although FIG. 4 shows exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
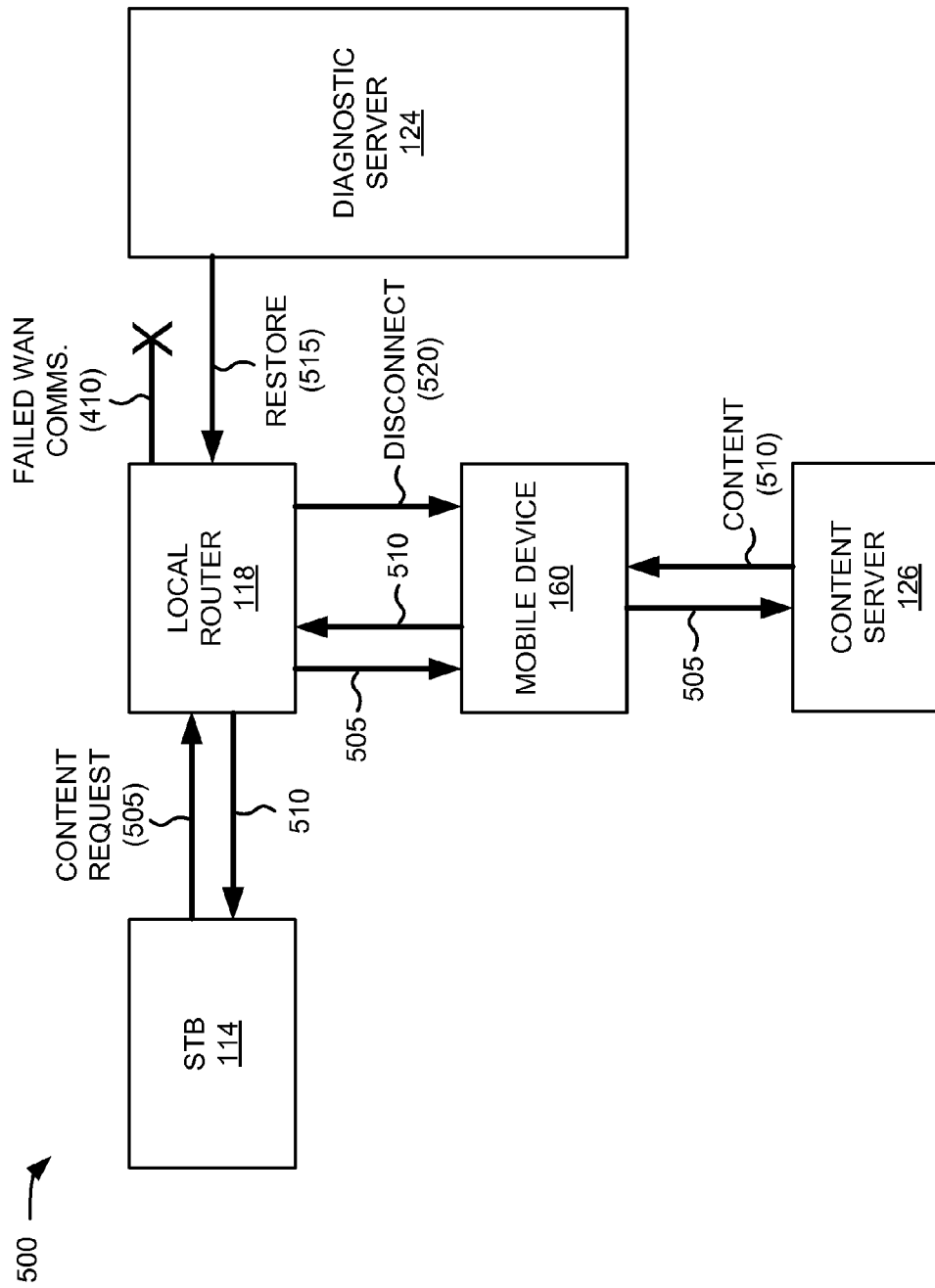
FIG. 5 is a block diagram illustrating further exemplary communications between devices in a still another portion of the network of FIG. 1.

FIG. 5 is a diagram of exemplary communications for another portion 500 of network 100. Communications in FIG. 5 may represent communications to provide backup connectivity, via a mobile device, for using a home network. As shown in FIG. 5, network portion 500 may include STB 114, local router 118, diagnostic server 124, content server 126, and mobile device 160. STB 114, local router 118, diagnostic server 124, content server 126, and mobile device 160 may include functionality described above in connection with, for example, FIGS. 1-4.

In one aspect, communications in FIG. 5 may generally be performed simultaneously with or after communications described above in connection with FIG. 4. As shown in FIG. 5, STB 114 may submit a content request, via local router 118, for particular content. Content request 505 maybe generated, for example, in response to user input. Content request 505 may include, for example, a request directed to a particular IP addresses for data (e.g., a menu/program guide, a web page, etc.) or program content (e.g., streaming content, downloaded content, etc.). Local router 118 may receive content request 505 and may determine if content request 505 is permitted in the current backup configuration. If content request 505 is not permitted, local router 118 may not pass through content request 505. Assuming content request 505 is permitted, local router 118 may forward content request via mobile device 160 to the particular IP address (e.g., content server 126).

Content server 126 may receive content request 505 and may respond by providing content 510 to STB 114 via mobile device 160 and local router 118. Failed WAN communications 410 may eventually be restored. In one implementation, upon detecting restored communications with local router 118, diagnostic server 124 may provide a restored signal 515 via the restored connection via managed network 140. Upon receiving restored signal 515, local router 118 may resume communications for home network 110 via managed network 140. Local router 118 may provide a disconnect signal 520 to mobile device 160 to disable the backup communication session with mobile device 160.

Although FIG. 5 shows exemplary components of network portion 500, in other implementations, network portion 500 may include fewer components, different components, differently-arranged components, and/or additional components than depicted in FIG. 5. Alternatively, or additionally, one or more components of network portion 500 may perform one or more other tasks described as being performed by one or more other components of network portion 500.

Figure 6:
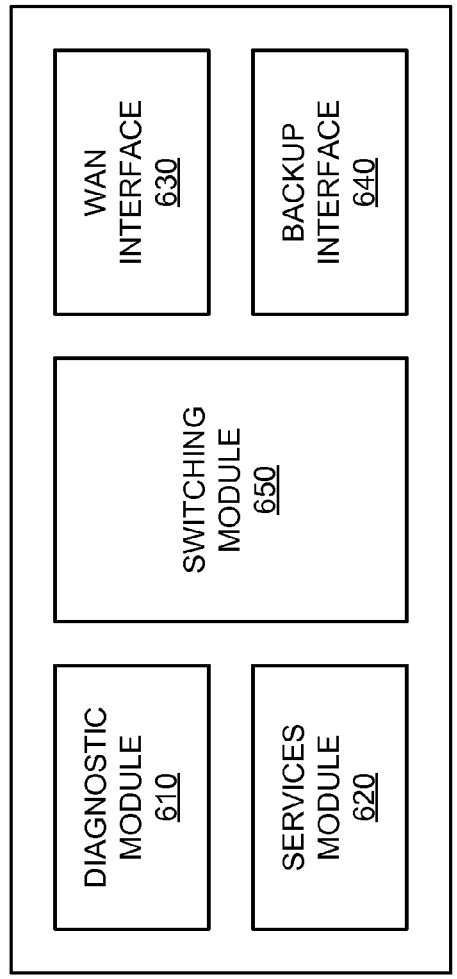
FIG. 6 a block diagram of exemplary functional components of a broadband home router of FIG. 1.

FIG. 6 is a block diagram of exemplary functional components of local router 118. In one implementation, the functions described in connection with FIG. 6 may be performed by one or more components of device 200 (FIG. 2). As shown in FIG. 6, local router 118 may include a diagnostic module 610, a services module 620, a WAN interface 630, a backup interface 640, and a switching module 650.

Diagnostic module 610 may receive and implement commands from diagnostic server 124 to support remote diagnostics and provisioning of devices within home network 110. In one aspect, diagnostic module 610 may employ remote management protocols, including, for example, TR-069 protocols. Diagnostic module 610 may be used to provide service activation and/or reconfiguration, remote customer support, configuration management, and/or diagnostics for local router 118 and other devices (such as STB 114) within home network 110. In one implementation, diagnostic module 610 may detect network connection problems, such as WAN connection problems with managed network 140.

Services module 620 may manage bidirectional communications for devices in home network 110 to support delivery of video content, execution of applications, file downloads, voice over IP calls, and/or other services. Services module 620 may forward communications from devices in a home network 110 (e.g., STB 114 or computing device 116) to external devices (e.g., in provider network 120 or elsewhere). Additionally, services module 620 may forward communications from external devices to devices in home network 110.

WAN interface 630 may include a wired or wireless interface to connect local router 118 to managed network 140. In one aspect, WAN interface 630 may be the primary or default communication interface for local router 118 to receive and forward traffic to/from home network 118.

Backup interface 640 may include a wired or wireless interface to permit communication between local router 118 and mobile device 160. In one implementation, backup interface 640 may include a WLAN interface to support an ad hoc point-to-point connection over Wi-Fi protocols. In another aspect, backup interface 640 may include a WPAN interface to support Bluetooth™ pairing protocols. In still another aspect, backup interface 640 may include a USB port for a wired connection with mobile device 160.

Switching module 650 may interact with mobile device 160 (e.g., the backup mode configuration application) via backup interface 640 to configure a backup connection for managed network 140. Switching module 650 may identify if a connection to managed network 140 has been lost/interrupted and request that user device 160 (e.g., as authorized by the user) initiate a backup session via backup interface 640. Once approved/activated by mobile device 160, switching module 650 may switch from WAN interface 630 to backup interface 640 to route certain traffic from home network 110 via mobile device 160. In one implementation, switching module 650 may register (or re-register) with one or more backend devices in provider network 120. For example, switching module 650 may provide a registration request including a local IP address where diagnostic module 610 is running and a port on which diagnostic module 610 is listening. Header information or other indicators may enable diagnostic server 124 to identify the new IP address for local router 118 over the backup path. In one aspect, switching module 650 may filter incoming/outgoing traffic to local router 118 based on user configuration settings. For example, switching module 650 may block traffic that is not identified as diagnostic traffic.

Although FIG. 6 shows exemplary functional components of local router 118, in other implementations, local router 118 may include fewer, different, or additional functional components than those depicted in FIG. 6.

Figure 7:
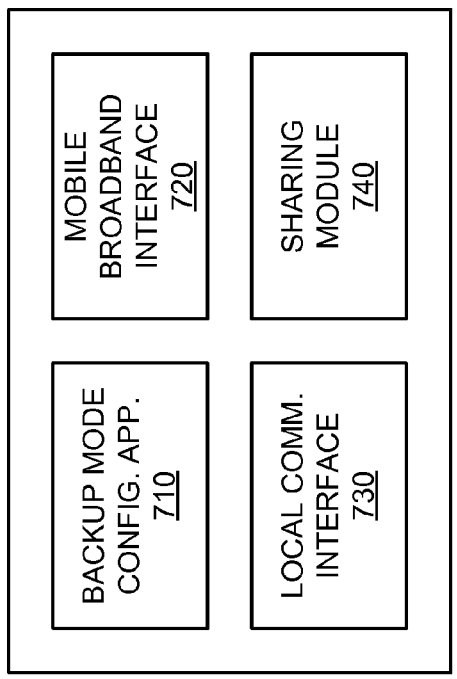
FIG. 7 is a block diagram of exemplary functional components of a mobile device of FIG. 1.

FIG. 7 is a block diagram of exemplary functional components of mobile device 160. In one implementation, the functions described in connection with FIG. 7 may be performed by one or more components of device 200 (FIG. 2). As shown in FIG. 7, mobile device 160 may include a backup mode configuration application 710, a mobile broadband interface 720, a local communication interface 730, and a sharing module 740.

Figures 8A, 8B:
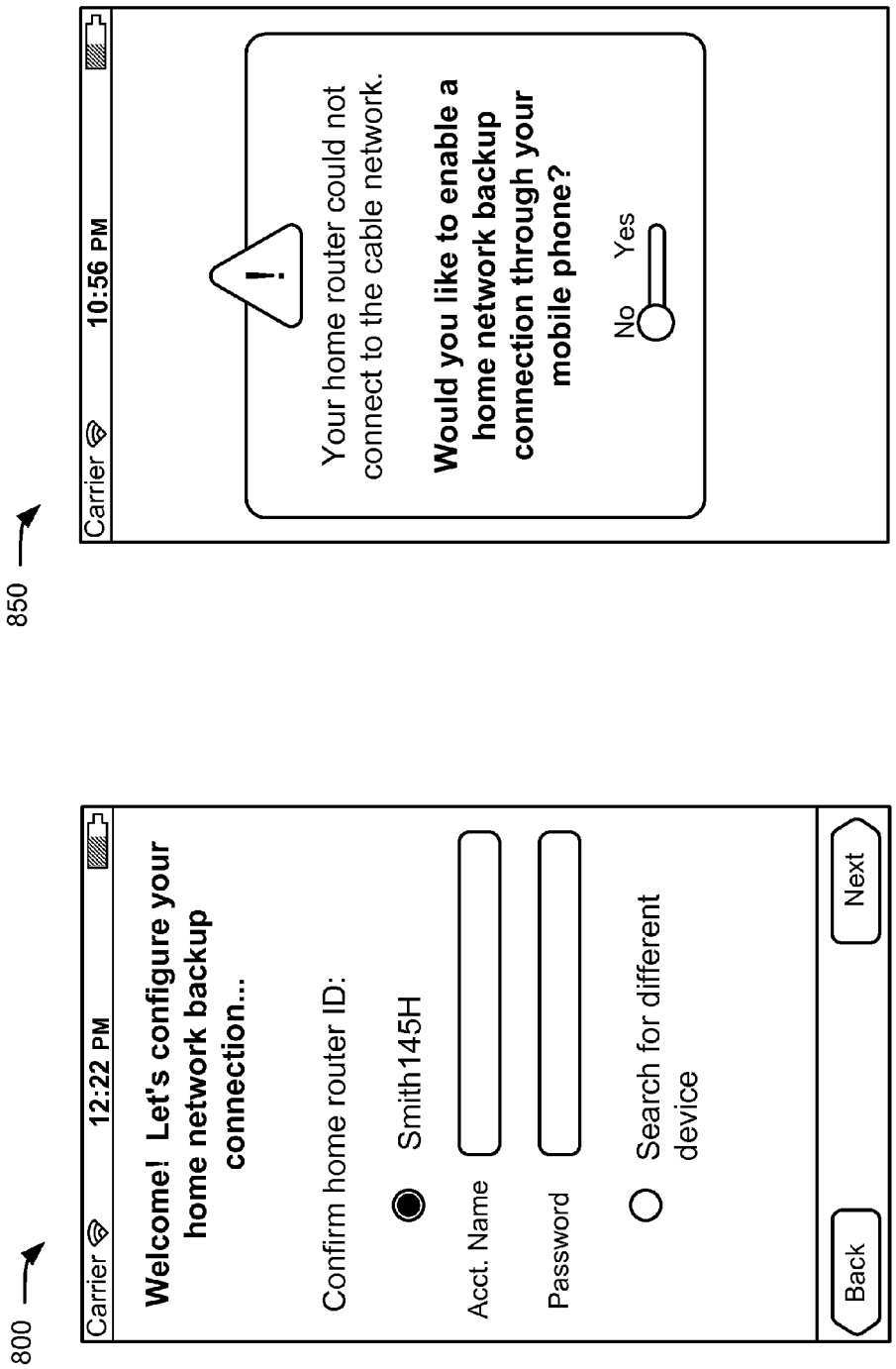
FIGS. 8A and 8B are exemplary user interfaces for the mobile device of FIG. 1, according to an implementation described herein.

Backup mode configuration application 710 may be downloaded by a user onto mobile device 160 or, alternatively, be provided as a factory installed option. Backup mode configuration application 710 may be used to setup mobile device 160 as a backup communications channel for local router 118. In one aspect, mobile device 160 may launch backup mode configuration application 710 to initiate a pairing process with local router 118. In one implementation, backup mode configuration application 710 may provide a user interface to solicit authorization and configuration settings for the backup communications channel (also referred to herein as a backup path). FIG. 8A provides an example of a user interface 800 that may be presented to a user to solicit a user/account name and password. Other user interfaces (not shown) may be provided on mobile device 160 to walk a user through different configuration settings for providing a backup communications channel. For example, backup mode configuration application 710 may request a user to identify particular types of traffic (e.g., critical traffic), from home network 110, that will be permitted over the backup interface. In one aspect, permitted types of traffic may include only diagnostic or maintenance traffic. In another implementation, permitted types of traffic may include keep-alive messages, IP data, or other essential communications. In still another aspect, registration information 320 may include configuration settings for the mobile device 160 to permit any traffic typically provided via managed network 140 over the backup interface on a priority basis. For example, VoIP or video traffic may be given priority over web surfing, etc.

In another aspect, backup mode configuration application 710 may also provide an alert to a user of mobile device 160 when local router 118 requests use of mobile device 160 as a backup communications channel. For example, backup mode configuration application 710 may include a setting to require express authorization from a user before enabling home network communications via mobile device 160. Upon receiving a backup path activation request from local router 118, backup mode configuration application 710 may present a user interface to solicit express authorization from a user before enabling a backup connection for home network 110. FIG. 8B provides an example of a user interface 850 that may be presented to a user of mobile device 160 to solicit authorization to enable a previously-configured backup connection for a home network. Assuming that user input to user interface 850 authorizes enabling the backup connection for home network 110, backup mode configuration application 710 may signal local router 118 to begin using the backup path.

Mobile broadband interface 720 may include an interface to enable mobile device 160 to send/receive communications via wireless access network 130. Local communication interface 730 may include one or more of a Wi-Fi interface, a WPAN interface, or a wired interface to enable mobile device 160 to communicate with local router 118.

Sharing module 740 may enable mobile device 160 to act as an intermediary between local router 118 and wireless access network 130. For example, sharing module 740 may enable mobile device 160 to receive traffic from local router 118 using local communication interface 730 and forward the traffic toward external devices, such as devices in provider network 120, via wireless access network 130. Similarly, sharing module 740 may enable mobile device 160 to receive traffic from provider network 120 via wireless access network 130 and forward the traffic to local router 118 using local communication interface 730.

Although FIG. 7 shows exemplary functional components of mobile device 160, in other implementations, mobile device 160 may include fewer, different, or additional functional components than those depicted in FIG. 7. For example, in another implementation, mobile device 160 may include a web browser.

Figure 9:
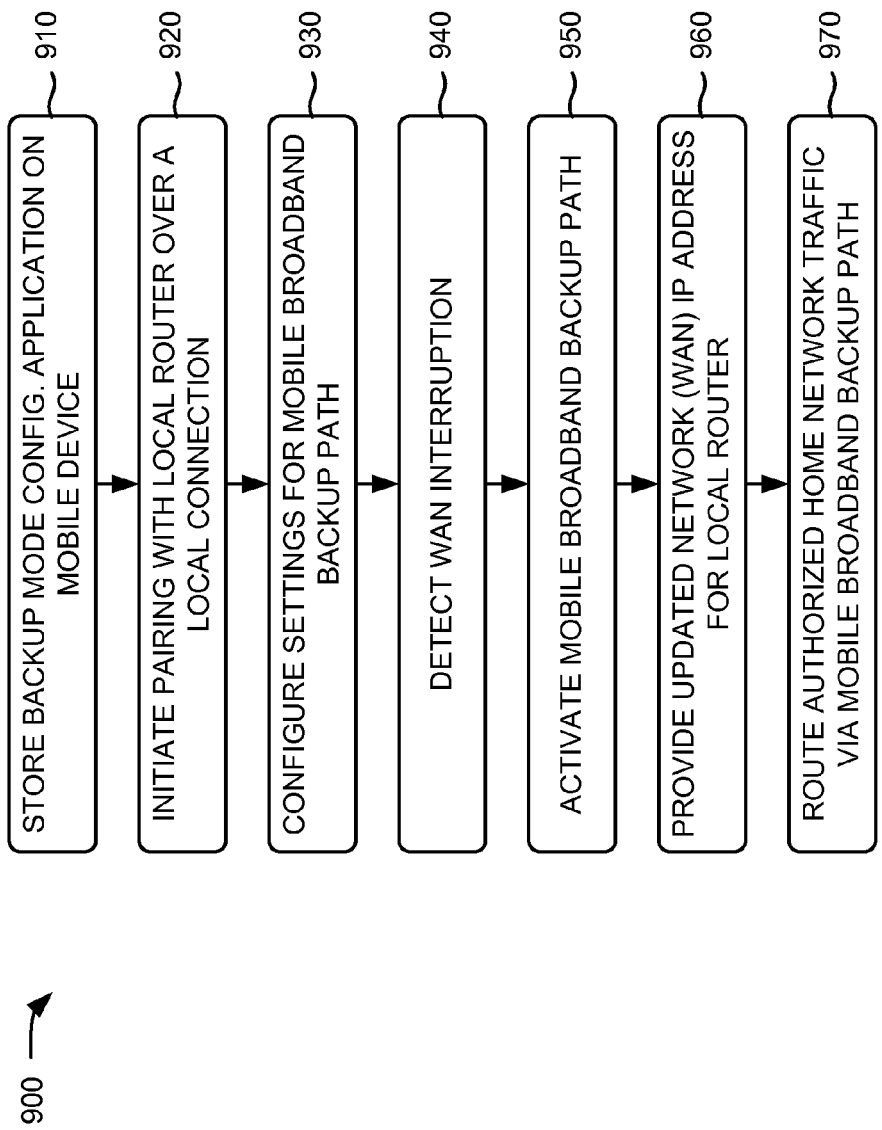
FIGS. 9 and 10 are flow diagrams of an exemplary process for providing a back-up path for in-home diagnostics and other home network communications according to an implementation described herein.

FIG. 9 is a flow diagram of an exemplary process 900 for providing a back-up path for in-home diagnostics and other home network communications according to an implementation described herein. In one implementation, process 900 may be performed by local router 118 and mobile device 160. In another implementation, some or all of process 900 may be performed by another device or group of devices, including or excluding local router 118 and/or mobile device 160. For example, in one implementation, another device in home network 110 may perform one or more parts of process 900.

As shown in FIG. 9, process 900 may include storing a backup mode configuration application (block 910), initiating a pairing between the mobile device and a local router over a local connection (block 920). For example, as described in connection with FIG. 3, application server 122 may forward the backup mode configuration application, as indicated by reference number 310, to mobile device 160. Mobile device 160 may receive and store application 310. The user of mobile device 160 may launch the backup mode configuration application to initiate a pairing process with local router 118 using, for example, a local wireless connection or a wired connection.

Process 900 may also include configuring settings for a mobile broadband backup path (block 930). For example, the backup mode configuration application on mobile device 160 may solicit configuration settings for a backup path (e.g., link 164) between local router 118 and mobile device 160. Configuration settings may include, for example, types of traffic (e.g., critical traffic) that may be allowed over backup interface 640. In one implementation, configuration settings may limit traffic, for example, to diagnostic/maintenance traffic or essential communications. In another aspect, other traffic may be permitted on a priority basis.

Process 900 may further include detecting a WAN interruption (block 940), and activating the mobile broadband backup path (block 950). For example, as described above in connection with FIG. 6, local router 118 (e.g., switching module 650) may identify if a connection to managed network 140 has been lost/interrupted and request that user device 160 (e.g., as authorized by the user) initiate a backup session via backup interface 640 (e.g., using link 164).

Process 900 may additionally include providing an updated network IP address for the local router (block 960), and routing authorized home network traffic via the mobile broadband backup path (block 970). For example, as described above in connection with FIG. 6, switching module 650 may provide a registration request, to diagnostic server 124, including a local IP address where diagnostic module 610 is running and a port on which diagnostic module 610 is listening. Header information or other indicators may enable diagnostic server 124 to identify the new IP address for local router 118 over the backup path. Local router 118 may then proceed to send/receive traffic via backup interface 640.

Figure 10:
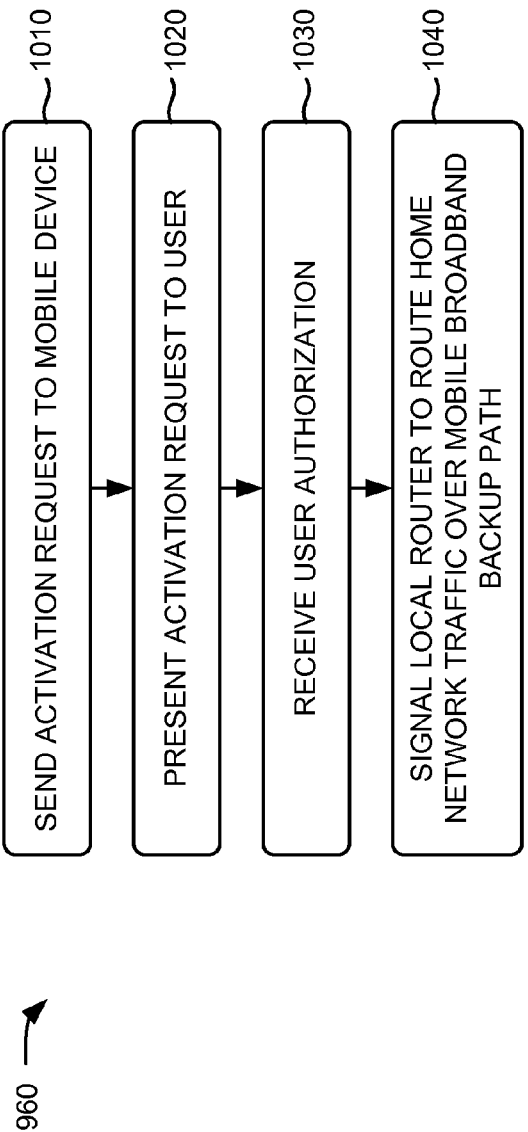

In one implementation, process block 960 may include steps shown in FIG. 10. As shown in FIG. 10, process block 960 may include sending an activation request to the mobile device (block 1010), presenting the activation request to the user (block 1020), receiving user authorization (block 1030), and signaling the local router to route home network traffic over the mobile broadband backup path (block 1040). For example, as described above in connection with FIG. 7, backup mode configuration application 710 may include a setting to require express authorization from a user before enabling home network communications via mobile device 160. Upon receiving a backup path activation request from local router 118, backup mode configuration application 710 may present a user interface, such as user interface 850 (FIG. 8B), to solicit express authorization from a user before enabling a backup connection for home network 110. Assuming user input to the user interface authorizes enabling the backup connection for home network 110, backup mode configuration application 710 may signal local router 118 to begin using the backup path.

According to implementations described herein, a system may include a local router for a home network and a mobile device. The local router may include a wide area network interface, a backup interface for a local network connection with a mobile device, and a processor configured to detect an interrupted connection with the wide area network and to switch to the local network connection with a mobile device, wherein the local network connection provides a first link of a backup path for the wide area network. The mobile device may include a local communications interface for the local network connection, a mobile broadband interface, and a processor configured to receive traffic from the local router using the local communication interface and forward the traffic toward an external device using a connection via the mobile broadband interface, wherein the connection via the mobile broadband interface provides a second link of the backup path for the wide area network. The system may provide a bidirectional backup path for critical communications over a failed primary wide area network link.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while the configuration and the implementation of a home network backup path have been described generally as using the same local network link. In other implementations, the backup path configuration may be performed using a different type of local connection than is later used for implementing the backup path. Also, while a series of blocks has been described with respect to FIGS. 9 and 10, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

What is claimed is:

1. A method, comprising:
    initiating, by a mobile device and over a local network connection, a pairing with a local router for a home network, wherein the local router is also connected to a managed wide area network;
    providing, by the mobile device and to the local router over the local network connection, configuration settings for a backup path for the managed wide area network, wherein the backup path includes the local network connection and a mobile broadband connection using the mobile device;
    receiving, by the mobile device and from the local router over the local network connection, a signal indicating an interruption with the local router's connection to the managed wide area network;
    presenting, based on receiving the signal indicating the interruption, a user interface to solicit user authorization of the backup path;
    receiving, via the user interface, the user authorization of the backup path;
    sending, by the mobile device and via the local network connection, a signal, responsive to the user authorization, to activate the backup path at the local router;
    receiving, by the mobile device and from the local router over the local network connection, particular types of traffic from the home network to enable critical communications; and
    forwarding, by the mobile device, the particular types of traffic from the home network over the mobile broadband connection.

2. The method of claim 1, wherein the local network connection includes one or more of:
    a wireless personal area network (WPAN) connection,
    a wireless local area network (WLAN) connection, or
    a wired connection.

3. The method of claim 1, wherein providing the configuration settings further includes identifying the particular types of traffic to allow over the backup path.

4. The method of claim 3, wherein one of the particular types of traffic to allow over the backup path includes data conforming to Technical Report 069 (TR-069) protocols.

5. The method of claim 3, wherein identifying the particular types of traffic to allow over the backup path includes prioritizing particular types of data.

6. The method of claim 1, further comprising:
    storing, in a local memory of the mobile device, a backup mode configuration application;
    launching the backup mode configuration application; and
    presenting, to a user of the user device, a user interface to solicit the configuration settings for the backup path.

7. The method of claim 1, further comprising:
    detecting, by the local router, the interruption with the local router's connection to the managed wide area network; and
    sending, by the local router over the local network connection, the signal indicating the interruption.

8. The method of claim 1, wherein the mobile device includes one of:
    a smart phone,
    a tablet computer,
    a laptop computer,
    a wireless device,
    a radiotelephone,
    a personal digital assistant,
    a global positioning system (GPS) device,
    a gaming device, or
    a mobile hot spot device.

9. The method of claim 1, further comprising:
    receiving, by the mobile device and from the local router, a local IP address and listening port for a diagnostic module of the local router; and
    sending, via the mobile broadband connection and to a diagnostic server, the local IP address and listening port for the diagnostic module.

10. A method, comprising:
    pairing, by a local router for a home network, the local router with a mobile device via a local network connection, wherein the local router is also connected to a wide area network;

receiving, by the local router and from the mobile device over the local network connection, configuration settings for a backup path for the wide area network, wherein the backup path includes the local network connection and a mobile broadband connection using the mobile device;

detecting, by the local router, an interruption with the local router's connection to the wide area network;

sending, by the local router and over the local network connection, a signal, to the mobile device, that indicates the interrupted connection to the wide area network and requests user authorization from a user of the mobile device to use the backup path;

receiving, by the local router and over the local network connection, a user authorization signal from the mobile device; and forwarding, by the local router and based on the detecting and the receiving the user authorization signal, critical traffic from the home network via the backup path.

11. The method of claim 10, wherein the local network connection includes one or more of:
a wireless personal area network (WPAN) connection, or
a wireless local area network (WLAN) connection.

12. The method of claim 10, wherein forwarding the critical traffic from the home network via the backup path further comprises:
filtering non-critical traffic from the backup path based on the configurations settings.

13. The method of claim 10, further comprising:
sending, to a diagnostic server and via the backup path, a local IP address and listening port for a diagnostic module of the local router.

14. A system, comprising:
a local router for a home network, the local router including:
a wide area network (WAN) interface,
a backup interface for a local network connection with a mobile device, and
a first processor configured to:
detect an interrupted connection with a wide area network,
send, to the mobile device and over the local network connection, a signal indicating the interrupted connection with the wide area network,
switch to the local network connection with the mobile device, wherein the local network connection provides a first link of a backup path for the wide area network,
filter non-critical traffic from the backup path based on configurations settings, and
forward critical traffic over the first link of the backup path: and the mobile device, including:
a local communications interface for the local network connection, a mobile broadband interface, and
a second processor configured to:
present, based on receiving the signal indicating the interrupted connection, a user interface to solicit user authorization of the backup path, and
receive the critical traffic from the local router using the local communication interface and forward the critical traffic toward an external device using a connection via the mobile broadband interface, wherein the connection via the mobile broadband interface provides a second link of the backup path for the wide area network.

15. The system of claim 14, wherein the mobile device further includes:
a backup mode configuration application to provide a user interface to solicit, from a user, the user authorization and the configuration settings for the backup path.

16. The system of claim 14, wherein the backup interface for the local network connection includes an interface for one or more of:
a wireless personal area network (WPAN) connection,
a wireless local area network (WLAN) connection, or
a wired connection.

17. The system of claim 14, wherein the first processor is further configured to send, to a diagnostic server and via the backup path, a local IP address and listening port for a diagnostic module of the local router, when the first processor switches to the local network connection with the mobile device.

18. The system of claim 14, wherein, when forwarding the critical traffic over the first link of the backup path, the first processor is further configured to:
filter non-critical traffic from the backup path based on the configurations settings.

19. The system of claim 14, wherein the first processor is further configured to:
receive, in response to the signal indicating the interrupted connection, an authorization signal, over the local network connection, from the mobile device.

20. The system of claim 14, wherein the critical traffic includes a remote management session between the local router and a diagnostic server.

* * * * *